Dec. 1, 1953   E. A. CAMPBELL   2,661,211
ROCKET SHIP AMUSEMENT APPARATUS
Filed Dec. 21, 1951   3 Sheets-Sheet 1
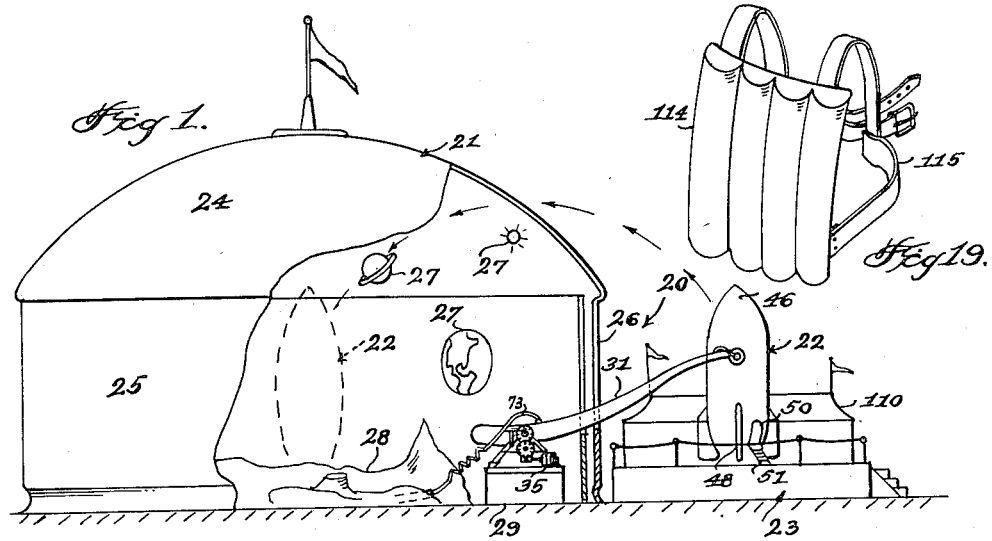
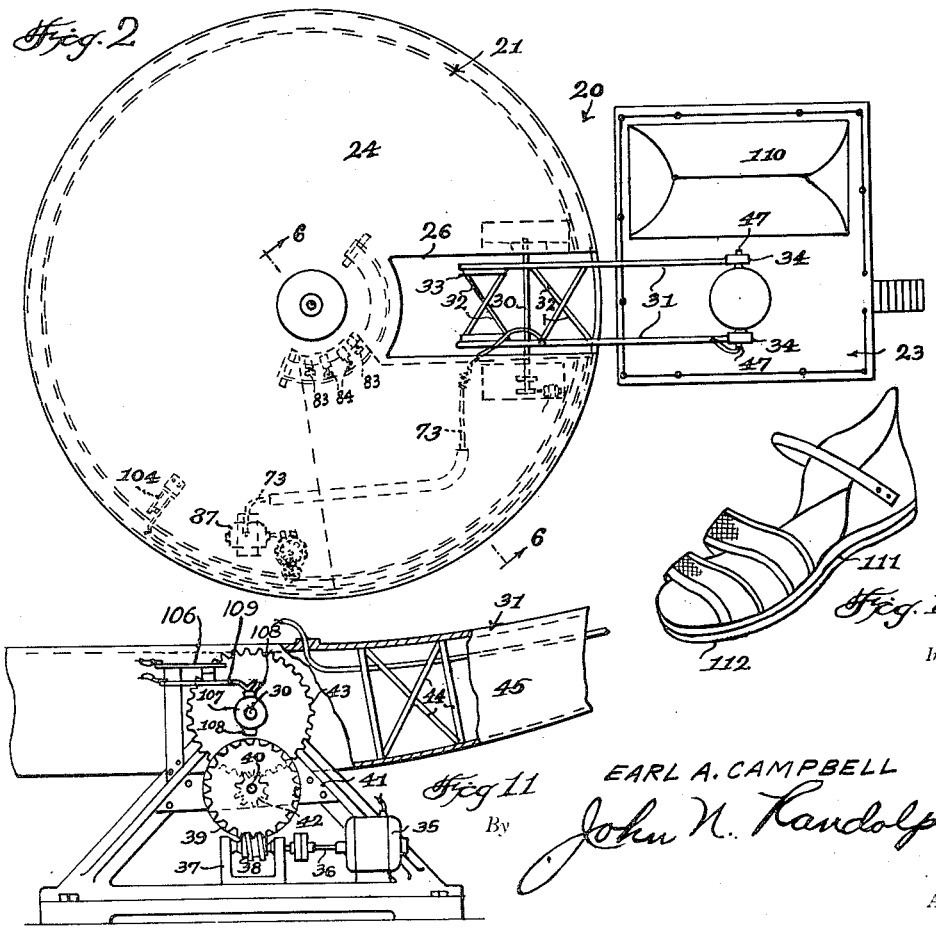
Inventor
EARL A. CAMPBELL
By John N. Randolph
Attorney Dec. 1, 1953 E. A. CAMPBELL 2,661,211
ROCKET SHIP AMUSEMENT APPARATUS
Filed Dec. 21, 1951 3 Sheets-Sheet 2
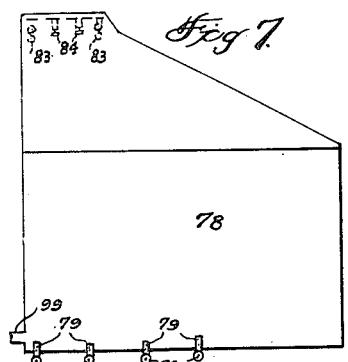
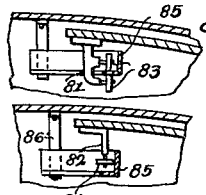
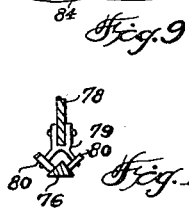
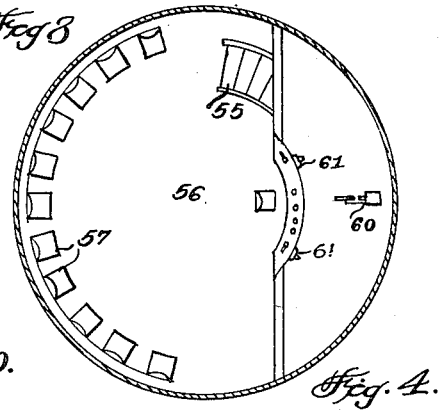
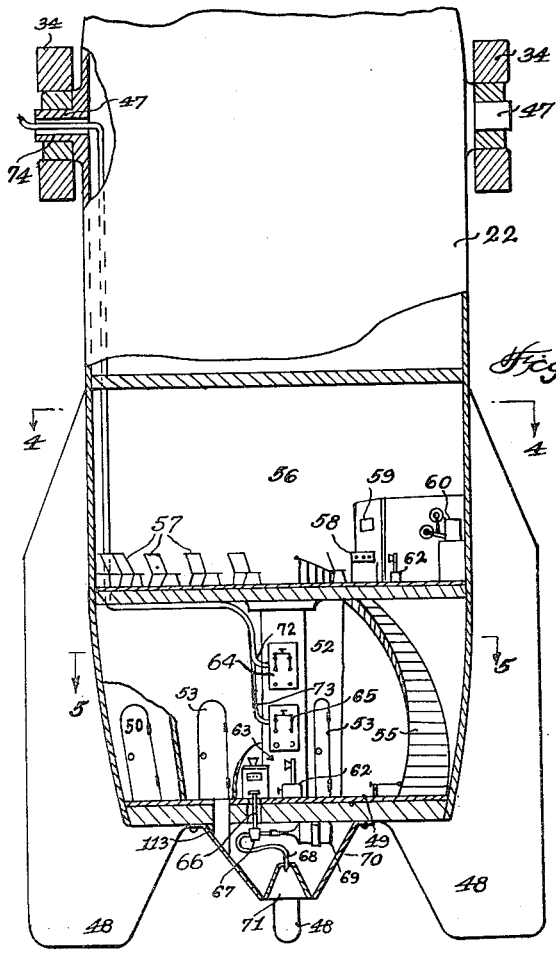
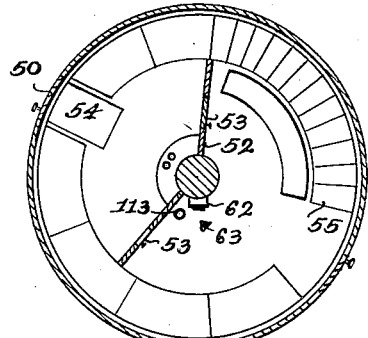
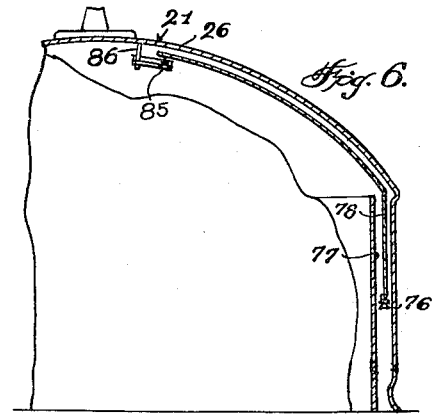
INVENTOR
EARL A. CAMPBELL
By John N. Randolph
Attorney

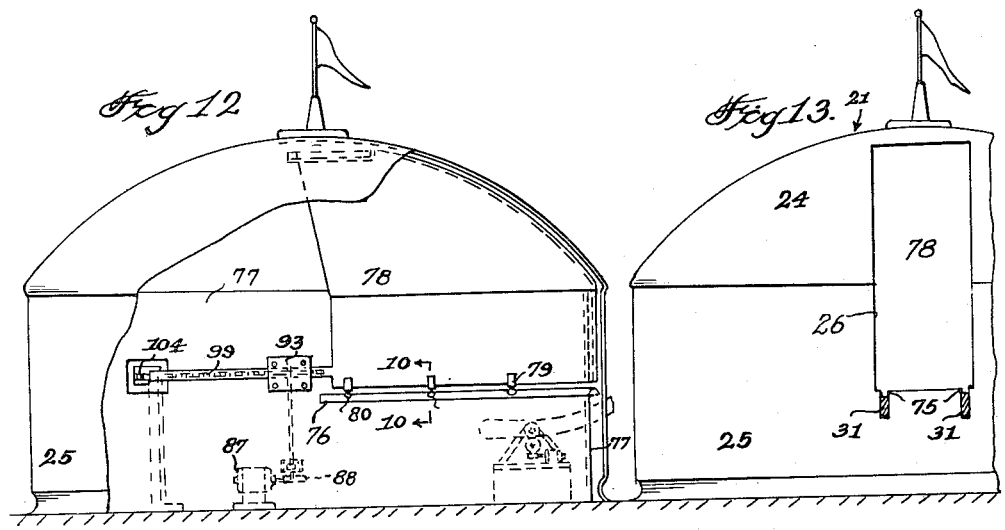
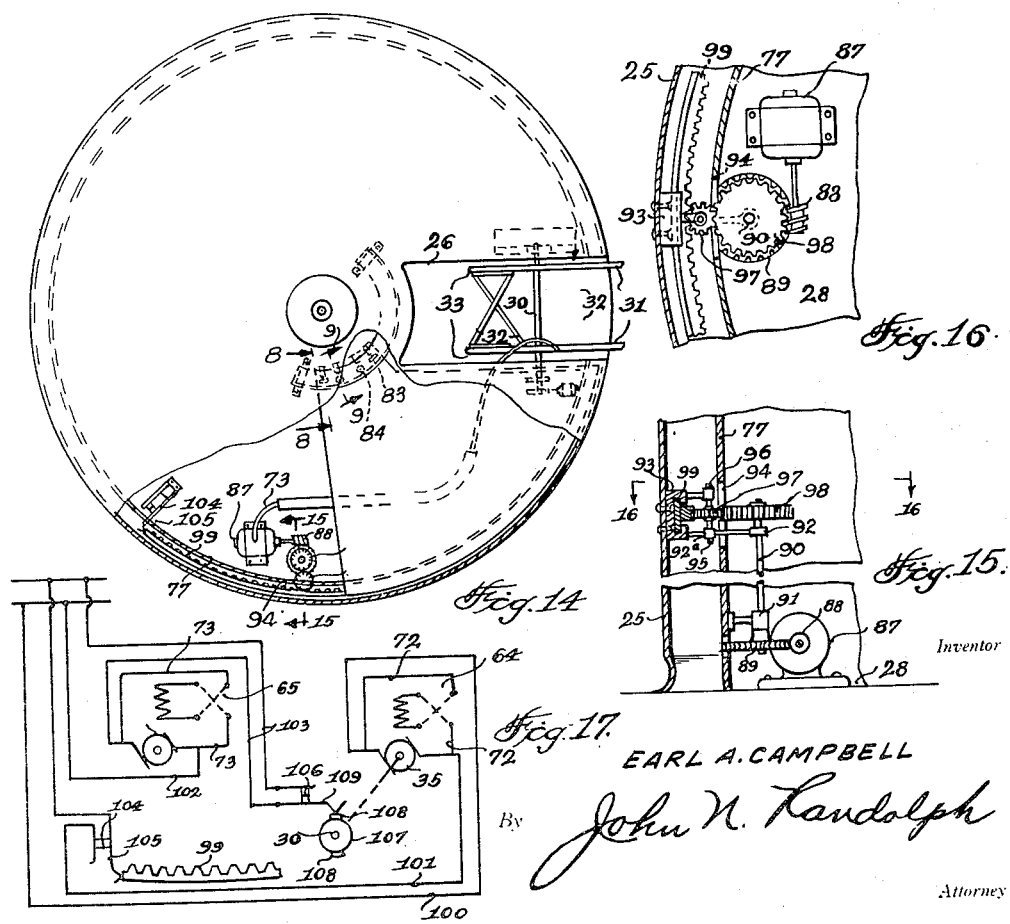

Patented Dec. 1, 1953

2,661,211

UNITED STATES PATENT OFFICE 2,661,211

ROCKET SHIP AMUSEMENT APPARATUS

Earl A. Campbell, Owosso, Mich.

Application December 21, 1951, Serial No. 262,827

6 Claims. (Cl. 272—18)

This invention relates to a novel apparatus for use in carnivals and other places of amusement and which is especially designed and constructed to simulate a rocket trip to another planet.

More particularly, it is an aim of the present apparatus to provide an amusement device which may simultaneously accommodate a number of passengers who are conveyed in a rocket type vehicle in a manner simulating free flight into an enclosure simulating another planet.

A further object of the invention is to provide an apparatus for realistically simulating a rarified atmosphere within the enclosure, simulating another planet.

Still another object of the invention is to provide means for visually and audibly simulating movement of the rocket carrier from its starting point to the planet simulating enclosure and back to the starting point, whereby the appearance of the planet simulating enclosure will be impressed upon the minds of the passengers during the travel of the rocket carrier to the enclosure.

Still a further object of the invention is to provide an apparatus of extremely simple construction which may be economically manufactured, which is capable of being safely and efficiently operated without risk of injury to the operators or passengers and which may be constructed in various sizes depending upon available space.

Various other objects and advantages of the invention will hereinafter become more fully apparent from the following description of the drawings, illustrating a presently preferred embodiment thereof, and wherein:

Figure 1 is a side elevational view partly in vertical section of the entire apparatus;

Figure 2 is a top plan view thereof;

Figure 3 is an enlarged fragmentary vertical sectional view partly in side elevation of the lower portion of the carrier;

Figures 4 and 5 are cross sectional views of the carrier taken substantially along planes as indicated by the lines 4—4 and 5—5, respectively, of Figure 3;

Figure 6 is a fragmentary vertical sectional view taken substantially along a plane as indicated by the line 6—6 of Figure 2;

Figure 7 is a plan view of the sliding enclosure;

Figures 8 and 9 are fragmentary cross sectional views taken substantially along planes as indicated by the lines 8—8 and 9—9, respectively, of Figure 14;

Figure 10 is a fragmentary vertical sectional view taken substantially along a plane as indicated by the line 10—10 of Figure 12;

Figure 11 is an enlarged fragmentary side elevational view, partly in vertical section of a portion of the apparatus;

Figure 12 is a side elevational view, partly broken away illustrating a portion of the enclosure of the apparatus;

Figure 13 is a fragmentary side elevational view taken at an angle to Figure 12 and illustrating the front portion of the enclosure;

Figure 14 is a top plan view, partly in section of the enclosure;

Figure 15 is a vertical sectional view taken substantially along a plane as indicated by the line 15—15 of Figure 14, and on an enlarged scale;

Figure 16 is a horizontal sectional view taken substantially along a plane as indicated by the line 16—16 of Figure 15;

Figure 17 is a diagrammatic view of the electric circuit of the apparatus;

Figure 18 is a perspective view of a specially constructed shoe for use with the apparatus, and Figure 19 is a similar view of a specially constructed jacket employed with the apparatus.

Referring more specially to the drawings, the amusement apparatus in its entirety is designated generally 20 and includes generally a large enclosure, designated generally 21, a rocket shaped carrier, designated generally 22, and a launching deck, designated generally 23.

The enclosure 21 may be of various sizes and shapes and is preferably circular in shape and has a dome-shaped roof 24. A portion of the side wall 25 and roof 24 of the enclosure 21 is provided with a relatively long opening 26, as best seen in Figure 2, which extends downwardly from adjacent the apex of the roof 24 to a point intermediate of the upper and lower edges of the side wall 25. The enclosure 21 is provided with no other opening than the opening 26 and in order to give the appearance of vastness, the interior thereof including the inner surface of the side wall 25 and roof 24 are painted a dark color, as a background and are provided with illuminated representations of the earth and other planets, as indicated at 27 in Figure 1. For the purpose of the description, it may be assumed that the interior of the enclosure 21 is intended to represent the "Moon"; however, as the description proceeds it will be readily apparent that it could represent any other celestial body such as one of the other planets than the earth. The floor 28 of the enclosure 21 is preferably formed of a built up framework covered with cement or other suitable material to simulate the rough, barren surface of the "Moon" and which is colored to blend with the scenery of the wall and roof to enhance the effect of vastness. Plant growths of grotesque appearances may be simulated to increase the weird and fantastic appearance of the interior of the enclosure 21.

A pair of spaced upstanding bearing supports 29 are disposed within the enclosure 21 adjacent the lower end of the opening 26. A shaft 30 extends through and is journalled in the upper ends of the bearing support and likewise extends through and is secured to corresponding portions of a pair of supporting arms or levers 31. The shaft 30 is secured to the levers 31 adjacent corresponding ends thereof and said levers are rigidly connected to one another adjacent the shaft 30 by cross braces 32. The complementary terminals of the arms or levers 31 which are located adjacent the shaft 30 are provided with counterweights 33, for a purpose that will hereinafter be described. It will also be noted that the levers 31 are of a slightly reversed curve from end-to-end thereof. The opposite ends of the levers 31 which are disposed remote to the shaft 30 and to the cross braces 32 are provided with transversely aligned bearings 34.

As best seen in Figure 11, one of the bearings 29 additionally forms a support for an electric motor 35 the armature shaft 36 of which has an outer end portion journalled in a small bearing 37. A worm 38 is fixed to the shaft 36 and meshes with a worm wheel 39 which is fixed to a short shaft 40. The shaft 40 is journalled in a bearing member 41 which is secured to and supported by the aforementioned bearing member 29. A pinion 42 is secured to the shaft 40 and meshes with a large gear 43 which is fixed to the shaft 30.

Also, as best illustrated in Figure 11, it will be noted that the levers or arms 31 are formed of metal framework 44 enclosed in a sheet metal covering 45, which is preferably aluminum.

The carrier 22 is in the shape of a rocket and will hereafter be referred to as such. The rocket 22 adjacent its upper end or nose 46 is provided with a pair of outwardly projected trunnions 47 which extend outwardly through and are journalled in the bearings 34, for swingably supporting the rocket 22 between the longer ends of the arms 31. The other lower end of the rocket 22 is provided with simulated fins 48, the lower ends of which are flat to form supporting feet on which the rocket 22 may rest in an upright position, as illustrated in full and dotted lines of Figure 1. The lower portion of the rocket 22, as best seen in Figures 3 and 5, is provided with a bottom compartment 49 containing an entrance and exit door 50. A demountable stairway 51 allows passengers to enter and leave the compartment 49 through the door 50, and said stairway 51 is adapted to be carried in the rocket 22 while said rocket is in motion or in "flight." The bottom compartment 49 is provided with a wall 52 having two doors 53 therein. The floor of compartment 49 is provided with a magnetized section 54 adjacent the door 50, for a purpose that will hereinafter be described. A stairway 55 leads from the bottom compartment 49 to an upper compartment 56, disposed thereabove, said stairway being disposed on the opposite side of the wall 52 to the door 50. The upper passenger compartment 56 is provided with a plurality of rocket type simulated seats 57, intended to be occupied by the passengers and which are situated around a simulated rocket control station 58, as best illustrated in Figures 3 and 4, equipped with suitable levers, buttons, dials etc.

A viewing screen 59 is disposed above the rocket station 58 in a position visible from any of the seats 57, on which the motion pictures are adapted to be projected by means of a motion picture projector 60 which is located behind the screen 59, which includes sound equipment and loud speakers 61. An intercommunication system 62 is provided between the simulated rocket control station 58 and a main control station 63, located in the lower compartment 49. In the lower control station 63 is provided two electric switches 64 and 65, hereinafter to be described, and a foot controlled valve actuator 66. The actuator 66 extends downwardly through the floor of the bottom compartment 49 for opening a valve 67 interposed in a pipe 68, leading from a storage tank 69 containing compressed air and any suitable harmless chemical by means of which the air may be colored. The parts 67, 68 and 69 are located in a housing 70 beneath the bottom of the rocket 22 which has a flared downwardly opening bottom portion 71 into which the discharge end of the conduit 68 opens. Electrical conductors 72 and 73 lead from the switches 64 and 65, respectively, upwardly through the rocket 22 and outwardly through a bore 74 to one of the trunnions 47.

As best seen in Figure 13, the wall 25 of the enclosure 21 is provided with two notches 75 which open upwardly into the lower end of the opening 26 in which portions of the arms 31 are accommodated when the rocket 22 is in its position of Figures 1 and 2, resting on the launching desk 23. A rail 76 of triangular shape in cross section is disposed concentrically around the inner side of a portion of the wall 25 adjacent the level of the notches 75 and may be suitably supported either by the wall 25 or by an inner fragmentary ceiling-wall 77 which is disposed concentrically with respect to a portion of the wall 25 and internally of the enclosure 21, the track 76 being disposed in the space between the inner wall 77 and the wall 25. A sliding closure 78 is disposed for movement in the space between the wall 77 and wall 25 and has fork members 79, as best seen in Figure 10, extending downwardly from its bottom edge and journalling pairs of downwardly converging rollers 80 which engage upwardly converging sides of the track 76 to provide a support on which the closure 78 may move freely. The closure 78 is shaped as illustrated in Figure 7 and the restricted upper edge thereof is provided with sets of brackets 81 and 82, as best illustrated in Figures 8 and 9, respectively, which project from its under or inner side. The brackets 81 support oppositely disposed vertically spaced rollers 83 and the brackets 82 each support a single roller 84 which is disposed in substantially a horizontal plane. It will be readily apparent that the closure 78 is curved to conform to the curvature of the wall 25 and roof 24, as best illustrated in Figures 6 and 12. A track 85 of angular cross section, as best seen in Figures 8 and 9, is supported beneath the roof 24 by hangers 86 and includes a substantially horizontally disposed flange the opposite sides of which are engaged by the opposed rollers 83 and a substantially vertically disposed flange, the inner concave side of which is engaged by the rollers 84 for supporting the upper part of the closure 78 for free sliding movement in a plane concentric with the roof 24.

As best seen in Figures 12, 14, 15 and 16, an electric motor 87 is secured on a flat portion of the enclosure floor 28 and has a worm 88 fixed to its armature shaft which meshes with a worm wheel 89 fixed to the lower end of a vertical shaft 90 which is journalled in bearings 91 and 92. The bearing 91 is secured to and extends inwardly from the inner wall 77. The bearing 92 is secured to a channel shaped guideway 93 which is secured to the inner side of a portion of the wall 25 and extends through a relatively large opening 94 of the inner wall 77. A shaft 95 is disposed in an upright position and journalled in a bearing portion 92a of the bearing 92 and in a bearing 96, which is likewise supported by the guide 93. The shaft 95 is disposed in the space between the walls 25 and 77 and has a pinion 97 fixed thereto, which meshes through the opening 94 with a gear 98. The closure 78, at the end thereof remote to the opening 26, is provided with an arcuate extension disposed adjacent its bottom edge and having a toothed inner surface forming a rack 99. The rack 99 slidably fits the guide 93 and the teeth thereof mesh with the teeth of the pinion or ratchet wheel 97.

Electric motors 35 and 87 are each of the reversible type, as illustrated in Figure 17 and the conductors 72 and 73 connect the switches 64 and 65, respectively, to the motors 35 and 87, respectively. The electric current is supplied from a suitable current source to the motor 35 by conductors 100 and 101 and current is supplied from the current source to the motor 87 by conductors 102 and 103. The switches 64 and 65 are interposed in the electric circuits of their respective motors 35 and 87, respectively. Accordingly, each switch 64 and 65 may be turned in one direction from an "off" position to cause the armature shaft of the motor to which it is connected to be driven in one direction or may be turned in the opposite direction from an "off" position to cause the armature shaft of the motor to be revolved in the opposite direction.

A normally open switch 104 is interposed in the conductor 101 of the motor 35 and is located whereby a movable contact bearing arm 105 thereof is located in the path of travel of the rack bar 99, so that as the door 78 approaches a fully opened position the rack bar 99 will strike the arm 105 to move the switch 104 to circuit closing position so that the switch 64 may then be actuated to cause the armature shaft of the motor 35 to be revolved in either direction. However, it will be apparent that the switch 104 will render the motor 35 inoperative except when the closure 78 is in a fully opened position. Similarly, the conductor 103 has a normally open switch 106 interposed therein which normally prevents the circuit being closed to the motor 87 by the switch 65 except when the switch 106 is held in a closed position. A disc 107 is fixed to the shaft 30 and is provided with two circumferentially spaced projections 108. When the arms 31 are in their positions of Figures 1 and 2, one of the projections 108 engages a movable contact carrying arm 109 of the switch 106 for maintaining the said switch in a closed position and when the shaft 30 is revolved so that the arms 31 are swung inwardly of the enclosure 21 to position the rocket 22 in its dotted line position of Figure 1, the other projection 108 is disposed to engage the arm 109 to maintain the switch 106 in a closed position so that the motor 87 can be energized only when the arms 31 are at either of their extremities of swinging movement.

The launching deck 23 may be of any suitable size and shape to preferably include a covered section 110 constituting a waiting room for passengers and which may contain a ticket booth, and an uncovered section on which the rocket 22 is supported by the fins 48 when the arms 31 are disposed in the notches 75, so that the door 78 may be closed, as illustrated in Figure 13. In addition to the operator who handles the sale of tickets on the launching deck 23, two operators are required for the apparatus 20, both of whom are stationed in the rocket 22, one at the lower control station 63 and the other at the upper control station 58. The operator located in the bottom compartment 49 collects tickets from the passengers as they enter the rocket through the door 50 and asso issues to each passenger a pair of "space" shoes, one of which is shown at 111 in Figure 18. The shoes 111 may be of any suitable construction which may be readily applied over conventional shoes; however, the soles of the shoes 111 are provided with metal inserts or metal portions 112. After the passengers have put on the shoes 111 they are sent by way of one of the doors 53 to the other side of the compartment 49 and directed up the stairway 55 to the upper compartment 56 where the other operator directs each passenger to a seat 57. When all of the passengers have been seated the operator in the lower compartment is so notified by the intercommunication system 62 and in turn notifies the operator of the upper compartment in the same manner that he is ready to commence the "Trip To The Moon." The operator in the lower compartment then throws the switch 65 in a direction to cause the motor 87 to turn in a direction to move the door 78 to an open position. Thereafter when the door has reached a fully opened position the operator moves the switch 64 to a position to cause the motor 35 to be energized to turn the shaft 30 in a direction to cause the arms 31 to swing counterclockwise as seen in Figure 1. At the same time that the operator actuates the switch 64 he also pushes on the valve actuator 66 to cause the chemically colored compressed air to be released from the tank 69 and expelled forceably through the flared outlet 71 for visually simulating a rocket blast as the rocket rises from the launching deck 23. It will be obvious that the rocket will maintain itself in an upright position by swinging relatively to the arms 31 as it passes upwardly and through the opening 26 into the enclosure 21. The operator from the control station 63 through a viewing opening 113 observes the descent of the rocket towards the floor 28 so as to move the switch 64 to an "off" position as the rocket approaches the floor to enable the rocket to make an easy landing. This results in the switch 106 being returned to a closed position so that the switch 65 may then be actuated to cause the motor 87 to turn in the other direction for returning the door 78 to a closed position and for opening the switch 104 to prevent energizing of the motor 35.

During this complete operation and from the time that the operator at the control station 58 is notified that the other operator is ready to commence the trip, the operator at control station 58 simulates operation of numerous switches simulating rocket operation at the control station 58 and explains space travel to the passengers. This operator also closes necessary switches for operating the movie projector 60 and sound equipment 61 so that a motion picture is projected on the viewing screen 59 to be viewed by the passengers as the rocket 22 leaves the launching deck 23 and which shows the "Earth"

rapidly diminishing in size until it appears only as another planet in space. The motion picture then shows the rocket passing comets and stars and finally approaching the "Moon" and as the rocket 22 completes its travel and comes to rest on the floor surface 28, the motion picture provides a bird's-eye view of scenery on the "Moon" which actually corresponds to the scenery in the closure 22, and which completes the timed motion picture viewed by the passengers during the movement of the rocket 22 from the launching deck 23 to the floor 28.

The passengers are then escorted from the upper compartment 56 down the stairway 55 and through the other door 53. The floor section 54 is magnetized and as each passenger steps upon this floor section a helium filled jacket 114 is placed upon his back and is fastened by the harness 115 thereon and which engages over the shoulders and around the waist. The passengers are advised that the doors 53 are closed before opening of the door 50 to prevent too much of the rarified atmosphere of the "Moon" from entering the rocket. The metal in the shoes 111 will counteract the lifting effect of the helium filled jackets 114 until the passengers step from the floor surface 54 and descend by the stairway 51 to the enclosure floor 28, whereupon the lift afforded by the jackets 114 will give the effect of lightness. The passengers are then conducted on a tour of the "Moon," and around a prescribed course of the floor surface 28, during which time they can observe the scenery within the enclosure 21 and which corresponds to the last scene of the motion picture viewed prior to leaving the rocket 22 including the other illuminated planets and celestial bodies 27, one of which appears as the "Earth."

Thereafter, the passengers are directed back into the rocket and the shoes 111 and jackets 114 are collected. After the passengers have returned to their seats in the upper compartment 56, signals are given as before and the operator from the lower compartment repeats the operation previously described for directing the travel of the rocket 22 back to the launching deck 23 after first opening the door 78 to render the rocket propelling motor 35 operative. After the door 78 has been returned to a closed position the passengers are discharged from the rocket. During the return trip, another timed film with sound effect is projected on the screen 59, which includes a showing simulating the rocket leaving the "Moon" and subsequently approaching the "Earth" after its trip through space.

Various modifications and changes are contemplated and may obviously be resorted to, without departing from the spirit or scope of the invention as hereinafter defined by the appended claims.

I claim as my invention:

1. An amusement apparatus comprising, in combination, a relatively large enclosure including a side wall, a dome-shaped roof and a floor and having a single relatively large opening formed in portions of the roof and side wall, the inner surface of the side wall and roof having illuminated portions simulating celestial bodies including the "Earth," said floor simulating the rough barren surface of a celestial body; a pair of carrier supporting arms mounted for swinging movement through the enclosure opening, means disposed within the enclosure on which said arms are swingably mounted adjacent corresponding ends of the arms for swinging movement of opposite remote ends of the arms to and from positions externally and internally of the enclosure, a power source for imparting motion to said means in either direction, a rocket-shaped carrier swingably supported adjacent one end thereof between the last mentioned remote ends of the arms for swinging movement therewith into and out of the enclosure through the opening thereof and for swinging movement relatively to the arms for maintaining the carrier in an upright position in all positions of the arms, an entrance and exit door adjacent the bottom of said carrier by means of which passengers may enter and leave the carrier, a passenger compartment within the carrier, and control means for operating the power source from within the carrier for imparting motion to the arms for conveying the carrier from a position externally of the enclosure to a position within the enclosure or conversely.

2. An amusement apparatus as in claim 1, a closure slidably disposed in the enclosure and movable to positions for closing and exposing the enclosure opening, a second power source located within the enclosure for moving the closure to either a closed or an opened position, and a second control means located within the rocket for actuating and controlling said second power source.

3. An amusement apparatus as in claim 2, each of said power sources including a reversible electric motor, and a normally opened switch interposed in the circuit of each electric motor, the normally opened switch of the electric motor of the first mentioned power source being moved to a circuit closing position by a portion of the closure when the closure is in a fully opened position, and the electric switch of the second power source being moved to a circuit closing position when the carrier supporting arms are at either extremity of their movement to prevent movement of the carrier and carrier supporting arms while the closure is in a closed or partially closed position and to prevent movement of the closure except when the carrier supporting arms and the carrier are in at rest positions at either extremity of their movement.

4. An amusement apparatus as in claim 1, and a launching deck disposed externally of the enclosure on which the carrier is supported in an at rest position at one extremity of its movement and externally of the enclosure.

5. An amusement apparatus as in claim 1, and a manually actuated means controllable from within the carrier for emitting a simulated rocket blast from the lower end of the rocket including a tank containing compressed air and a harmless chemical coloring material.

6. An amusement apparatus as in claim 1, said passenger compartment including a simulated rocket control station having a screen, and a motion picture projector with sound equipment for projecting a motion picture on the screen simulating a trip through space and including a picture corresponding to the interior appearance of said enclosure.

EARL A. CAMPBELL.

References Cited in the file of this patent

UNITED STATES PATENTS

| Number | Name | Date |
|---|---|---|
| 546,927 | Lake | Sept. 24, 1895 |
| 949,532 | Farrell | Feb. 15, 1910 |
| 1,112,307 | Manterola | Sept. 29, 1914 |
| 1,127,094 | Salsbury | Feb. 2, 1915 |
| 1,987,004 | Eyerly | Jan. 8, 1935 |